United States Patent
Chao

(10) Patent No.: US 8,056,001 B2
(45) Date of Patent: Nov. 8, 2011

(54) METHOD AND APPARATUS FOR CLASSIFYING ELEMENTS OF A DOCUMENT

(75) Inventor: Hui Chao, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1688 days.

(21) Appl. No.: 10/410,999

(22) Filed: Apr. 10, 2003

(65) Prior Publication Data

US 2004/0205081 A1  Oct. 14, 2004

(51) Int. Cl.
*G06F 17/00* (2006.01)

(52) U.S. Cl. ........ 715/243; 715/276; 707/802; 707/821; 382/165; 382/224

(58) Field of Classification Search .................. None
See application file for complete search history.

(56) References Cited

U.S. PATENT DOCUMENTS

| | | | | |
|---|---|---|---|---|
| 5,574,802 A * | 11/1996 | Ozaki | ........................... | 382/176 |
| 5,895,470 A * | 4/1999 | Pirolli et al. | ................. | 707/102 |
| 5,926,824 A * | 7/1999 | Hashimoto | ................... | 715/520 |
| 6,020,972 A * | 2/2000 | Mahoney et al. | ............ | 358/1.14 |
| 6,826,727 B1 * | 11/2004 | Mohr et al. | .................... | 715/517 |
| 6,901,169 B2 * | 5/2005 | Bottou et al. | ................ | 382/224 |
| 2003/0072487 A1 * | 4/2003 | Fan et al. | ...................... | 382/176 |
| 2003/0133617 A1 * | 7/2003 | Mukherjee | .................... | 382/239 |
| 2004/0066530 A1 * | 4/2004 | Wu et al. | ....................... | 358/1.15 |
| 2004/0199872 A1 * | 10/2004 | Oakeson et al. | ............. | 715/515 |
| 2005/0207666 A1 * | 9/2005 | Bottou et al. | ................ | 382/243 |
| 2005/0210371 A1 * | 9/2005 | Pollock et al. | ................ | 715/509 |
| 2005/0210372 A1 * | 9/2005 | Kraft et al. | .................... | 715/509 |

* cited by examiner

*Primary Examiner* — Alicia Lewis

(57) ABSTRACT

A method of classifying elements of a document includes receiving a file defining a document having at least one page and a plurality of elements. Each selected element is classified into one of a plurality of categories based on at least one of the element type, location, size (area, height, or width), or recurrence throughout the document.

5 Claims, 7 Drawing Sheets

METHOD AND APPARATUS FOR CLASSIFYING ELEMENTS OF A DOCUMENT

FIELD OF THE INVENTION

This invention relates to the field of document production and publishing. In particular, this invention is drawn to classifying document elements into categories such as content and background.

BACKGROUND OF THE INVENTION

Various software products are available for generating publication quality documents. Typically, the source files may be created and manipulated as necessary by an editor or layout software application. The source files are in a format that facilitates editing by the editor or layout software application. In order to print the document, however, the source files are compiled and converted into a printer-ready file suitable for processing by a printer for reproduction.

Although the source files may be converted into rasterized files that specifically identify the pixels to be printed, such files are limited in usefulness because they are specific to resolution, make, and model of printer. Moreover, the storage requirements of rasterized files tend to increase with the square of the desired resolution.

To facilitate variable resolution, a wide variety of printers, and ease of distribution, printer-ready files are typically defined using a page description language (PDL) in modern publishing workflows. The source file manipulated by the design or layout software is used to produce a printer-ready file defined in a page description language. PostScript® (Adobe Systems, Inc. of Mountain View, Calif.) and Printer Control Language (PCL® Hewlett Packard Company, Palo Alto, Calif.) are examples of page description languages. PDLs attempt to define elements of the document as objects such as lines, arcs, text, etc. so that printed page appearance is consistent regardless of printer platform.

Although the printer-ready file may be readily available, logical relationships between page elements is typically lost when the source document is compiled and converted into a printer-ready file. Thus, for example, distinction between document content and background is lost. Without the ability to distinguish between the two, legitimate document re-use or document element re-use is compromised.

SUMMARY OF THE INVENTION

In view of limitations of known systems and methods, various methods for classifying elements of a document are described.

Methods of classifying elements of a document include receiving a file defining a document having at least one page and a plurality of elements. A location, size, and type of each element is defined by the file. Each selected element is classified into one of a plurality of categories based on at least one of the element type, location, size (area, height, or width), or recurrence throughout the document.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
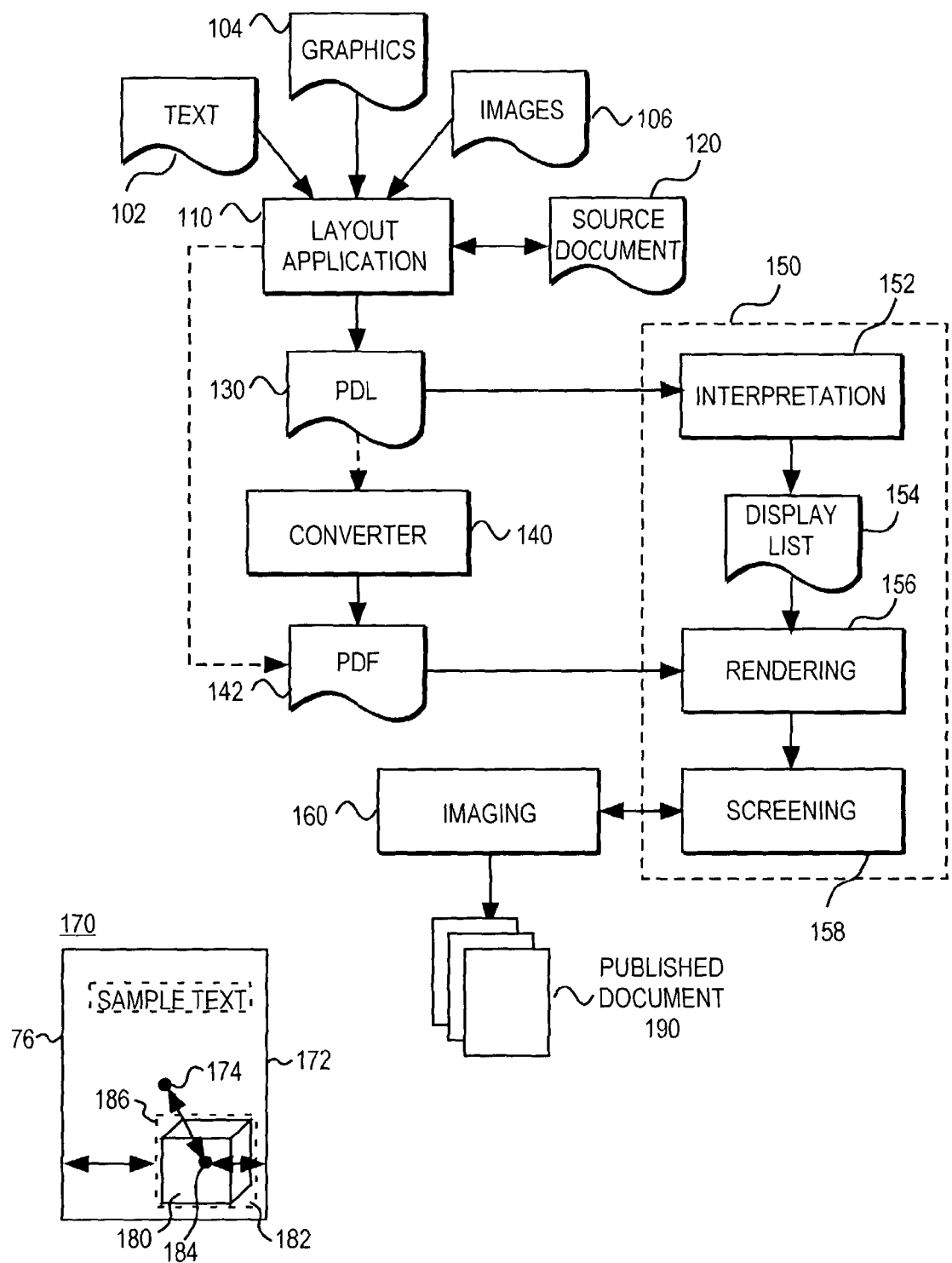
FIG. 1 illustrates one embodiment of a publishing workflow.

FIG. 1 illustrates one embodiment of a publication workflow. A layout application 110 is used to position text 102, graphics 104, and image 106 elements within the publication. Graphics elements may comprise vector or line art elements including arcs, lines, circles, etc.

The layout application may include editing tools for creation and modification of the text, graphics, and image elements. The resulting file is typically stored in a file format native to the layout application. Thus source document 120 corresponds to the document to be published and is arranged in a format suited to the layout application to facilitate interpreting, modifying, and saving.

Once the layout is acceptable, the layout application can generate a printer suitable file 130 that can be sent to the printer to produce the publication in hardcopy. Modern printing processes receive files defining the document to be published using a page description language (PDL). A PDL format permits the user to describe the items to print without specifically identifying or calculating the pixels to be turned on or off. PDL file 130 is an Adobe Systems PostScript® file in one embodiment.

The PDL file 130 is sent to a raster image processor 150 (RIP) to provide data compatible with the imaging hardware. A RIP includes an interpretation stage 152, a rendering stage 156 and a screening stage 158. The "ripped" file is then sent to imaging,160 to generate the published document 190.

The PDL file 130 is a program that must be executed sequentially from beginning to end by the interpreter 152 to produce a display list 154 that defines each page. Neither the PDL file 130 nor the display list 154 distinguishes between background and foreground or background and content layers.

The portions of the PDL file corresponding to individual pages of the published document 190 may not even be discernable since resources defined on one page may be used on a subsequent page. This creates difficulties when extracting, inserting, deleting, or modifying individual documents of the page.

Another popular format used in publishing is the Adobe Systems Portable Document Format® (PDF). The layout application 110 may be capable of generating a PDF 142 version of the publication represented by source document 120. Alternatively, the PDL file 130 may be passed through a converter 140 to generate the PDF version.

PDF files are somewhat analogous to the display lists generated by a PostScript® interpreter. Unlike PostScript® files, a PDF file is not a program. The PDF representation eliminates the need for a sophisticated interpreter. PDF files provide a database or cross-reference table of all elements in the document and where they are to be located in the published document. This simplifies extracting, inserting, deleting, or modifying individual documents of the page. Despite the fact that the location of an element is readily discernable, distinction between content and background is lost when generating a PDF file.

Without a distinction between content and background, document reuse is complicated. Thus re-creating a set of slides with the same content but a different background may be very difficult unless the original graphic design or layout application 110 and the original source document 120 used to generate the PDF or PostScript® file is still available.

PDF defines the location and dimension of an element by identifying the location of the smallest box that encompasses that element. The box has a location, width, and height. The type of element encompassed by the box is also indicated. The size and center of each element box may be determined directly or through calculation.

Figure 2:
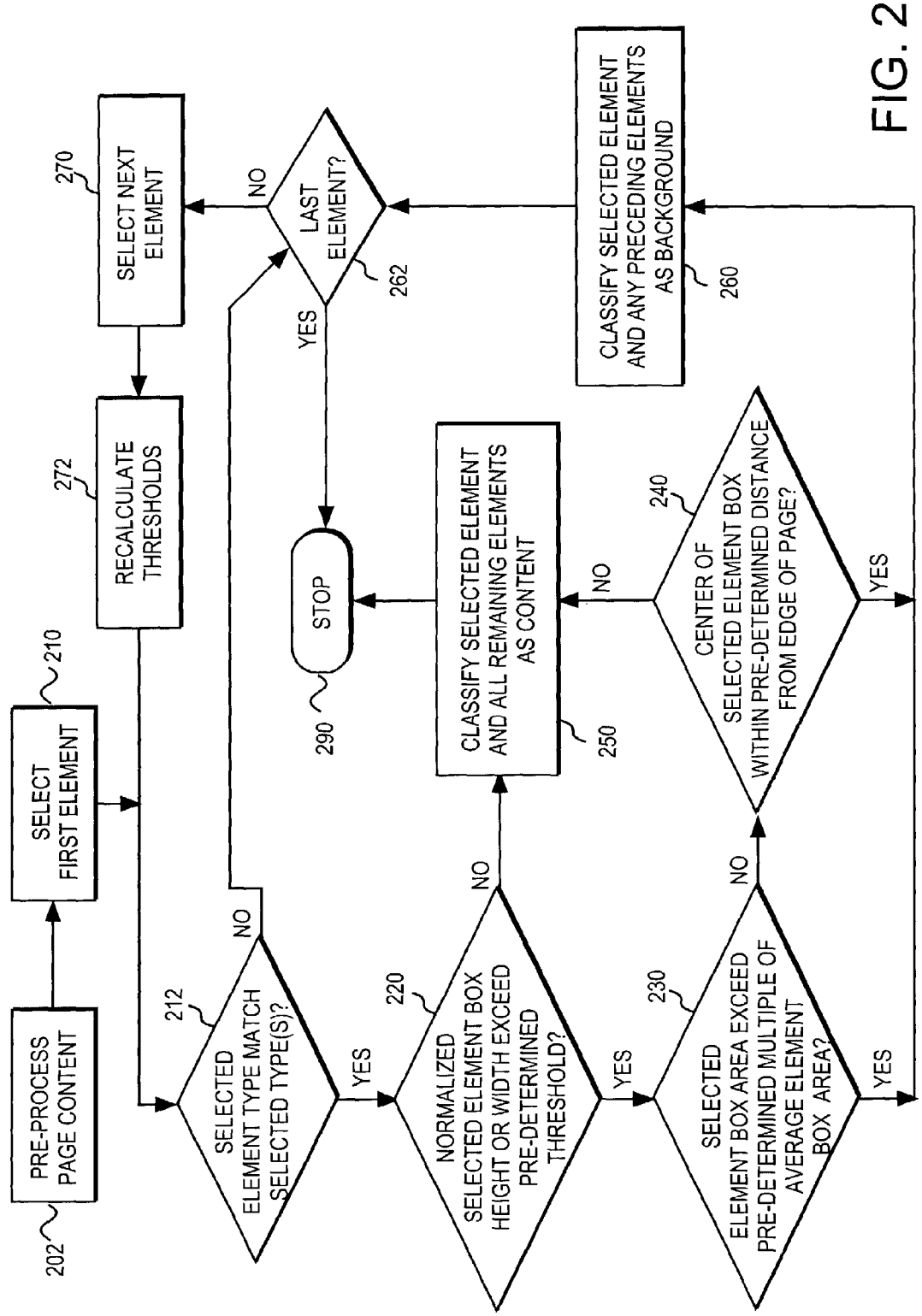
FIG. 2 illustrates one embodiment of a process that classifies page elements as content or background based on element type, size (area, height, or width) and location.

FIG. 2 illustrates one embodiment of a process that classifies some elements as content or background based on size and location for a single page document. The process may be repeated for each page of a multi-page document, however, classification of elements on any selected page is performed independently of the classification of elements on other pages. The process is described with respect to the analysis of a file defining a single page.

The file is pre-processed in step 202 to produce a form suitable for further processing. For example, if the page is initially defined using Adobe PostScript®, the file may be pre-processed to distill the document into a form (e.g., PDF) that clearly defines the type, size, location, and value of all the page elements without the need for further interpretation.

For accurate comparison, the analysis is done at the atomic page element level rather than with groups of page elements. Pre-processing eliminate hierarchies of page elements. Pre-processing also calculates thresholds, and initializes classification of the elements, if necessary, for subsequent classification of the page elements. In one embodiment, all elements are initially declared "content" in step 202. Subsequent processing may change the classification.

In one embodiment, a PDF formatted file may be processed. A PDF file, for example, may have page elements that are containers or forms containing other elements. Containers and forms consist of a sequential list of elements. The sequential list is extracted and substituted for the container or form while preserving sequential order. If necessary, the extraction is performed recursively until all the page elements are "atomic" (i.e., do not consist of other page elements). Pre-processing also calculates any initial threshold values required for the analysis as described below.

The first page element is selected in step 210. PDF documents describe the page contents as stacks of page elements. Step 210 selects the page element associated with the bottom-most layer. Typically this is the first page element appearing in the portion of the file defining the page being analyzed. To facilitate editing and saving, however, the order that the page elements are encountered when proceeding physically sequentially through the page definition file may not correspond to the layer order. In such a case, the page elements have an associated indicator to identify their logical order. Step 210 selects the logically first page element.

In step 212, the type of the selected element is checked to see if it one of a selected type (e.g., graphic, image). If the element is not one of the selected type(s), step 262 determines if the selected element is the last element. If so, processing stops with step 290. If not, then the next element (proceeding sequentially in a logically sequential order) is selected in step 270. Thresholds for subsequent calculations are re-calculated in step 272, if necessary. Processing then continues with step 212 again. Steps 212-272 repeat until an element of a selected type (i.e., graphics, image) is encountered.

If the selected element type is one of a selected type, processing continues with step 220 to determine if the normalized height or normalized width of the corresponding element box exceeds a pre-determined threshold. The element is classified as content in step 250, if the normalized height or normalized width does not exceed the pre-determined threshold.

The normalized height is calculated as the object height divided by the page height. Similarly, the normalized width is defined as the object width divided by the page width. If the normalized height or width exceeds a pre-determined threshold of 90%, for example, the selected element would have a width or height approaching the page width or page height, respectively.

If the normalized height or width exceeds the pre-determined threshold, step 230 determines if the area of the selected element box (i.e., the smallest box that encloses the whole element) exceeds another pre-determined threshold. In one embodiment, the area threshold is calculated as a multiple of the average element box area. If the threshold is exceeded, the element is classified as a background element in step 260.

The average element box area is defined as the average area of all the element boxes on the current page for elements of the selected type(s). In various embodiments, the average area may be calculated as the arithmetic mean, geometric mean, or median. The area threshold may be computed during pre-processing.

In one embodiment, the area threshold is selected as the maximum of the areas of all the page elements that have not been classified as background elements. This threshold is clearly dynamic in nature and must be recalculated (step 272) each time an element is classified as a background element.

If the threshold has not been exceeded, then the position of the element box is examined. Referring to FIG. 1, sample page 170 is provided to illustrate some of the parameters used when classifying the elements based on position.

Page 170 may consist of a plurality of elements of different type such as image element 180. Each element has an element box 182 that has a center 184 and a plurality of edges 186. The page 170 also has a center 174 and a plurality of edges 172, 176. In one embodiment, the proximity of an edge 186 of the element box 182 to a corresponding edge 176 of the paper is examined for each edge of the element box. Alternatively the proximity of the center 184 of the element box 182 to the nearest edge of the paper may be determinative of whether the element is a background or a content element. In yet another embodiment, the proximity of the center 184 of the element box 182 to the center of the page 174 may be used as an indicator of whether the element is a background or content element.

Referring again to FIG. 2, step 240 determines if any edge of the element box is near a corresponding edge of the page. This may be accomplished by comparing the plurality of distances measured from each edge of the element box to a corresponding edge of the page with a distance threshold. If the smallest distance is less than or equal to the distance threshold, then the element is near an edge of the page and is classified as a background element in step 260. Step 260 also classifies any elements preceding the selected element as background elements. This affirmatively classifies all elements up to the selected element or resets their classification if they were initially classified as "content" in the pre-process step 202.

In one embodiment, the distance threshold is selected as the distance of a page element that is closest to an edge of the page as determined from the subset of page elements that have not been classified as background elements. This threshold is clearly dynamic in nature and must be recalculated (step 272) each time an element is classified as a background element.

Once the selected element is classified as content in step 250, all remaining elements are similarly classified as content and the process is completed in step 290. The first content element is thus a transitional element marking the transition between one category and another category of classification when proceeding logically sequentially through the page elements.

If, however, the selected element is classified as background in step 260, step 262 determines if the selected element was the last element on the page. If so, processing is completed in step 290. Otherwise, processing may continue with another element selected in step 270. Threshold recalculations are performed in step 272 to handle dynamic thresholds that are a function of characteristics of a subset of all the page elements. Steps 212-272 are then repeated until all the elements have been processed.

Thresholds for the various tests may be static thresholds that are invariant throughout the categorization process. Alternatively, thresholds may be dynamic throughout the categorization process such that their values fluctuate depending upon attributes of some of the page elements. Generally, the process of FIG. 2 may rely upon any combination of static and dynamic thresholds for categorization of the page elements.

In general, the process of FIG. 2 identifies relatively large graphic objects, or graphic objects near the edge of the page as background elements. The process effectively classifies page elements based on location, size (e.g., area), and dimension (i.e., height, width). Other elements, however, may be generally deemed background even though they may be relatively small in area due to their recurrence throughout the document. Although size may include height and width, dimension is specifically set forth to emphasize that individual characteristics of size (e.g., height alone or width alone) may be sufficient to categorize the page elements.

In multi-page documents, background elements tend to recur on every page or every other page of at least a portion of the document. In some cases, the element is somewhat static in nature. For example, a footer or header may have background text that does not change in value for at least a portion of the document. The same chapter number might appear on every page or every other page of a chapter. Similarly, the name of a periodical is frequently indicated on every page or every other page of the publication such as a periodical.

In other cases although the value of the element might change, the element is generally considered to be a background element. Page numbers, for example, are considered to be background elements. Characteristics of recurring background elements of a specific type (e.g., text) include similar size and position even though the value of the element may not be the same throughout the document.

Figure 3:
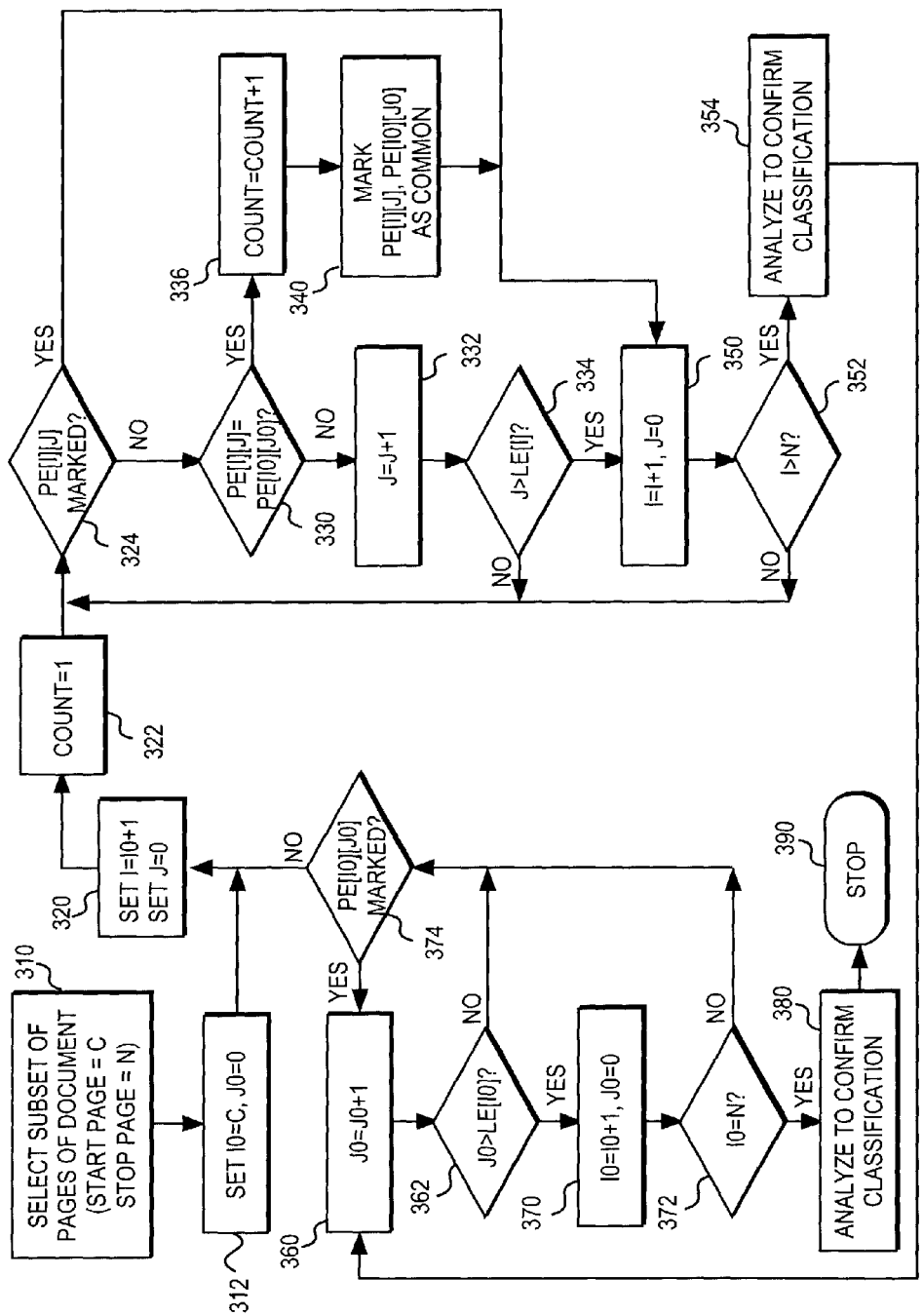
FIG. 3 illustrates one embodiment of a process that classifies page elements as content or background as a function of frequency of occurrence.

FIG. 3 illustrates a method of distinguishing between background elements and content in a multi-page document. Elements are classified as "common" based on the recurrence of elements with similar attributes and position on other pages of the document.

In step 310, a page subset (S) of the document is selected, where D represents the set comprising every page of the document and $S \subseteq D$. In one embodiment, the page subset comprises consecutive pages starting with page C through page N. Although the user may choose to analyze all pages for background elements, typically documents may have several pages that can be disregarded for analysis. For example, the table of contents, index, etc. may be ignored in many cases.

The array PE[I][J] refers to the Jth page element on page I. I0 and J0 are indices for a subject or reference page element which is compared with subsequent candidate elements to identify matches. Step 312 initializes I0 to C corresponding to the selected start page. Step 312 also initializes J0 to point to the first element on that page.

Step 320 selects the first element on the page following page 10 as a candidate for comparison. Step 322 initializes the variable COUNT to 1. COUNT tracks the number of pages that the element PE[I0][J0] appears on (or at least the number of pages that elements having attributes sufficiently similar to those of PE[I0][J0] as determined by the equality test of step 330).

Step 324 determines if candidate page element PE[I][J] is already marked as a common element. If not, then step 330 compares candidate page element PE[I][J] with PE[I0][J0]. If they are the same, COUNT is incremented in step 336. Then PE[I][J] is marked as a common element in step 340 and processing continues with step 350 to move to the next page.

If step 330 determines they are not equal, step 332 increments the candidate page element index J. The function LE[I] indicates the index of the last element on page I. Thus step 334 determines if the calculated J exceeds the number of elements on the current candidate page I. If not, then the process returns to step 324 to process the new candidate page element.

If the calculated J exceeds the number of elements on the current candidate page, processing continues with step 350 to select the first element on the next page as the candidate page element by incrementing I and setting J=0. If the value of I does not indicate a page beyond the last page N as determined in step 352, then the process returns to step 324 to process the new candidate page element.

If the value of I indicates that all pages have been processed with respect to the current common element PE[I0] [J0], additional analysis may be performed in step 354 to confirm the classification. In particular, step 354 may change the "common" designation based on other considerations such as whether the number of occurrences of the selected element is sufficient to maintain the classification.

Once all the pages have been processed with respect to the current page element (PE[I0][J0]), steps 360, 362, 370, 372, [-] 374, and 320 are performed to select the next subject page element.

Step 360 increments J0 to select the next page element on the current subject page I0. If J0 exceeds the number of page elements (LE[I0]) on the current subject page as determined by step 362, then I0 is incremented and J0 is set to 0 to select the first element on the next page as the subject page element in step 370.

If I0 is not equal to the last page N, step 320 selects the first element on the next page as the candidate page element for comparison. The processing of the candidate page elements then continues in steps 324-352 as previously described. If the subject page number I exceeds the last page N of the selected subset of pages, all the elements on all the pages have been processed. As with step 354, step 380 performs additional analysis to confirm the classification. Given that the analysis may result in unmarking elements, it may be more computationally efficient to perform some analysis in step 380 rather than step 354. Typically, performing the analyses in step 380 might require a marking process that enables association between common elements and the reference element (i.e., PE[I0][J0]) that they were determined to be common to. The process stops in step 390.

Figure 4A:
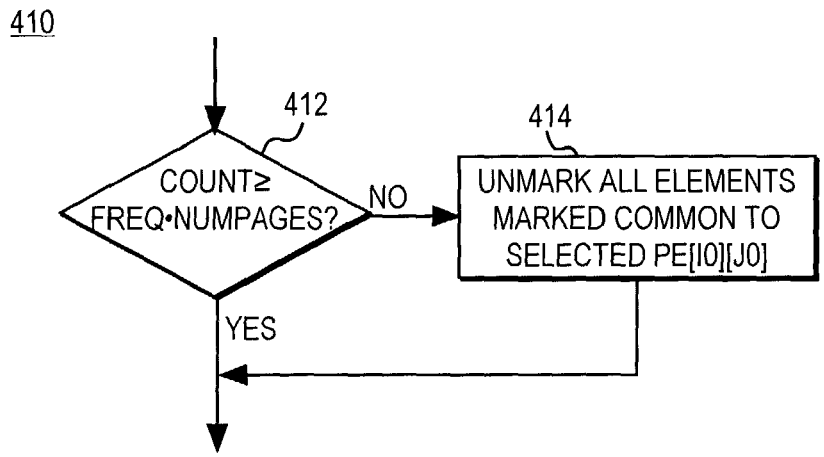
FIGS. 4A and 4B illustrate tests for validating classification.
Figure 4B:
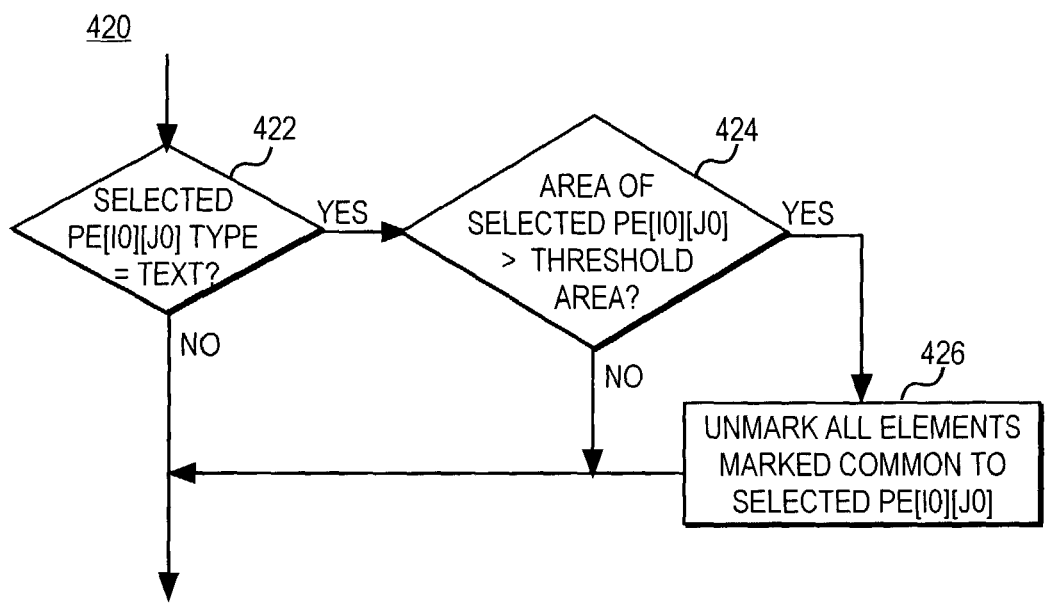

FIGS. 4A and 4B illustrate tests 410, 420 that may be performed in one of steps 354 and 380 to confirm or validate the "common" classification. If performed in step 380, the test is performed for each group of common elements distinguished by their distinct reference elements (i.e., PE[I0][J0]).

Test 410 analyzes the frequency of occurrence of the common element to validate classification. If performed in step 354, the selected PE[I0][J0] is the current PE[I0][J0] and COUNT is readily available. If the more sophisticated marking process is used, test 410 may be performed within step 380. The COUNT may be calculated by counting every element marked as being common to the selected PE[I0][J0]. In such a case, steps 322 and 336 of FIG. 3 (related to maintaining a page count) may not be required.

In step 412, the frequency of occurrence of a selected reference element is checked to see if it exceeds a pre-determined frequency threshold. COUNT indicates the number of pages that the common element appeared on. FREQ is a frequency threshold. NUMPAGES is the total number of pages examined (i.e., N−C+1). If the common element does not appear with sufficient frequency as determined by the threshold, then all the elements marked as common to a specific reference element (i.e., PE[I0][J0]) (including PE[I0][J0]) are unmarked in step 414. Otherwise the selected PE[I0][J0] appears with sufficient frequency to remain classified as a common element.

Test 420 analyzes element specific details such as type and size to validate the classification. Step 422 determines if the selected PE[I0][J0] is a text element by testing the element type. If not, the selected PE[I0][J0] and elements marked common to the selected PE[I0][J0] maintain their "common" classification.

If the selected PE[I0][J0] is a text element, step 424 determines if the area of the selected PE[I0][J0] exceeds an area threshold. The area threshold might represent, for example, a percentage of the area of the page (e.g., 1%). If not, the selected PE[I0][J0] and elements marked common to the selected PE[I0][J0] maintain their "common" classification. If the area threshold is exceeded, then the selected PE[I0][J0] and elements marked common to the selected PE[I0][J0] are unmarked in step 426.

Test 420 may be useful, for example, in discriminating between dynamic text representing page numbers and dynamic text that appears in the same position on different pages throughout the document. They may both be "common" due to their frequency of occurrence. The page number, however, is clearly background. Other dynamic text of sufficient size is less likely to be background.

The process of FIG. 3 assumes that for any selected subject page element, there is at most one common element on each of the pages following the subject page element. Step 324 is designed to avoid potentially computationally expensive step 330 if a candidate page element has already been marked.

With respect to comparing elements in step 330, the equality test may be based on a subset of all the available attributes. For example, the elements may be considered equal even if they differ in color or other attributes. In one embodiment, step 330 compares a selected subset of attributes of the subject page element and the candidate page element. In one embodiment, for example, the page element type (e.g., text, graphic, image, etc.) and the height, width, and location (i.e., center (X, Y)) of the page element boxes for the subject and candidate page elements are compared. Thus attributes such as color, font, font size, value, etc. may be ignored in one embodiment for purposes of identifying dynamic background objects such as page number, date, title, print time, print date, section heading, chapter heading, or color varying borders.

After the classification performed by the process of FIG. 3, the subset of page elements marked common are considered to be background elements. The remaining elements are considered to be content elements. The process of FIG. 3 classifies page elements based on frequency of occurrence of the element (or of elements having the same value for the examined attributes).

Figure 5:
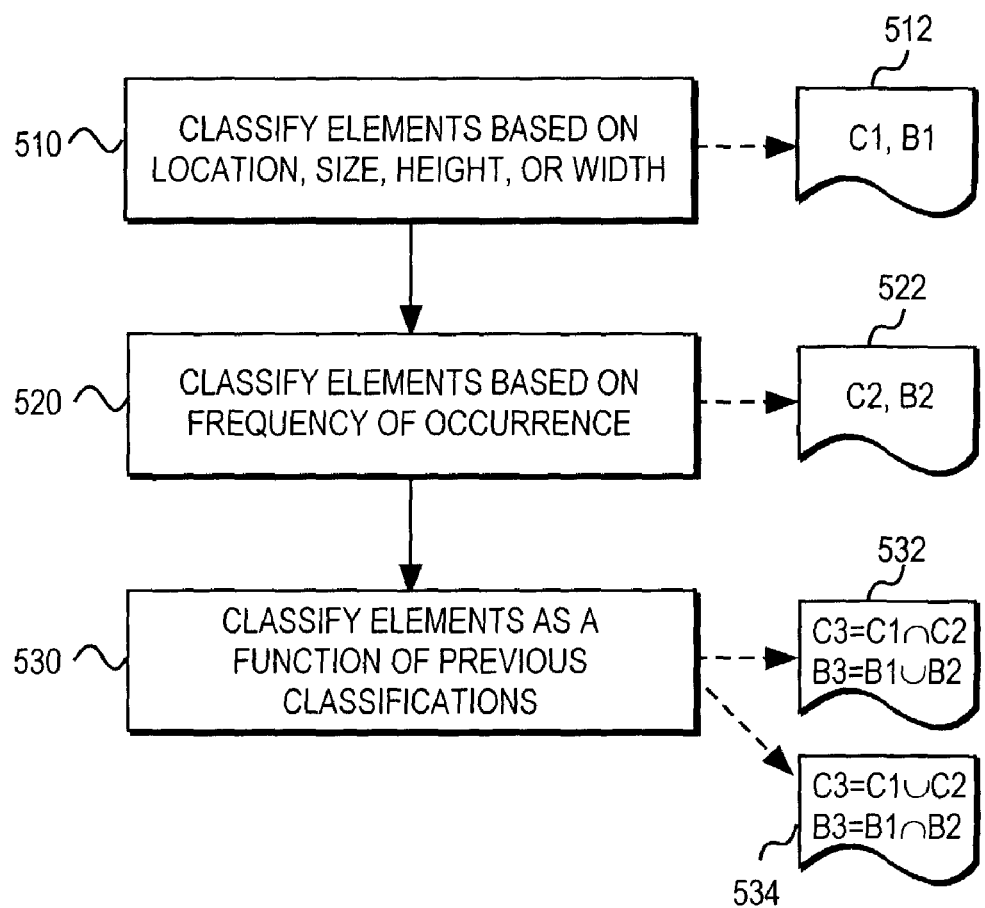
FIG. 5 illustrates one embodiment of a process that classifies page elements as content or background as a function of element type, size (area, height, or width), location and frequency of occurrence.

The processes of FIGS. 2 and 3 may be combined as illustrated in FIG. 5. The combination may be described mathematically as a union or intersection of sets of elements. The union of two sets X and Y is the set obtained by combining the elements of X and Y and is expressed as $X \cup Y$. The intersection of two sets X and Y is obtained by selecting only the subset of elements common to both X and Y. The intersection of X and Y is expressed as $X \cap Y$. The empty set is a set without any elements and is denoted by the symbol $\emptyset$.

As indicated in step 510, the process of FIG. 2 is performed for each page of the document to classify the individual elements of the set of all document page elements (D) as belonging to the defined subsets of either content (C1) or background (B1), where $D = C1 \cup B1$ and C1 and B1 are mutually exclusive (i.e., $C1 \cap B1 = \emptyset$) as indicated by resultant set 512. The process of FIG. 3 is similarly performed in step 520 to classify the set of all document page elements into one of the mutually exclusive subsets of content (C2) or background (B2), where $D = C2 \cup B2$ based on frequency of occurrence as indicated by resultant set 522. (Common elements are classified as background and the remaining elements are classified as content and $C2 \cap B2 = \emptyset$).

Due to the different techniques, the processes may result in different classifications for some page elements (i.e., C1≠C2). The process of FIG. 3 only identifies elements occurring with a certain frequency as background and thus would serve to filter the results of the process of FIG. 2.

Accordingly, conflicts in classification are resolved in step 530 by defining the resultant set of background elements (B3) as $B3 = B1 \cup B2$. The resultant set of content elements (C3) is $C3 = C1 \cap C2$. This solution is indicated by resultant set 532.

Alternatively, the resultant set of background elements (B4) might be selected as $B4 = B1 \cap B2$. The resultant set of content elements (C4) is then $C4 = C1 \cup C2$ as indicated by resultant set 534.

Resultant set C4 tends to classify more elements as content in contrast with resultant set C3. This more conservative position may be appropriate when preservation of content is more important than eliminating background.

Once page elements are classified as content or background, the page elements may be manipulated as a class. This separation of content from background is enabled by the classification process. The user may selectively discard, for example, all background elements.

Figure 6:
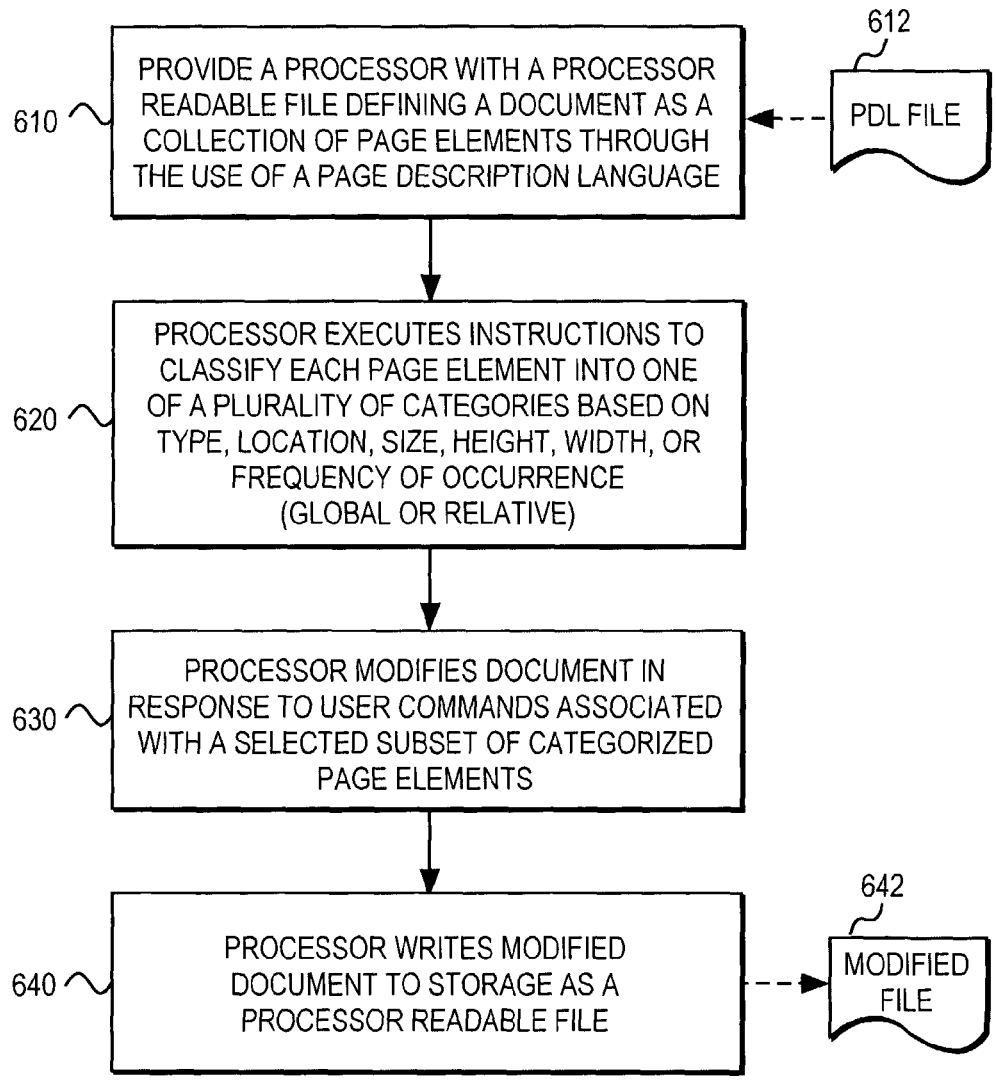
FIG. 6 illustrates one embodiment of a computer implemented process for classifying and modifying categories of page elements.

FIG. 6 illustrates one embodiment of a processor implemented process for separating a document into background and content page elements. The processor is provided with a processor readable file (PDL file 612) defining a document as a collection of page elements through the use of a page description language in step 610.

In step 620, the processor executes instructions to classify each page element into one of a plurality of categories based on type, location, size, height, width, or frequency of occurrence. For each selected page element, the thresholds for categorization may be independent of the values of the appropriate attributes of other page elements (i.e., global thresholds), or the thresholds may vary depending upon the values of the appropriate attributes of other page elements (i.e., relative thresholds). Alternatively, a combination of global and relative thresholds may be used for categorization. In one embodiment, the page elements are classified into one of two categories: content or background.

In one embodiment, categorization enables the user to re-use, eliminate, or otherwise modify at least one of the categorized sets of page elements, thus resulting in a modification to the document. Modification may include changing attributes such as font, color, size, etc. as those attributed might apply to the elements within a categorized set.

In step 630, the processor executes instructions to modify the document in response to user commands directed to a selected subset of the categorized page elements. The user might use a pointing device such as a mouse to select the page elements classified as background, for example, and then issue a command to eliminate them from the document.

In one embodiment, the user is permitted to manually re-characterize an element classified as belonging to one category into another category. Thus, for example, the user may override the result of the automated classification for one or more elements. In order to aid the manual classification process, the elements might be presented in list form or with the use of distinct highlight colors on a computer system display.

In step 640, the processor writes the modified document to storage as a processor readable file (e.g., modified file 642). The processor may write the modified document to storage using a page description language. Alternatively, the processor may write the modified document to storage using an alternative file format.

Writing the document to storage using an alternative file format (e.g., a format other than the native format of the PDL document) tends to result in a loss of information otherwise necessary to faithfully reproduce selected page elements with the same attributes that they had in the source PDL document. This loss of ability to accurately model a portion of the original PDL document may be irrelevant, however, if the goal of separation is to extract one or more categories of page elements for re-use in a new document. For example, the user may desire elimination of content that otherwise obscures a background image. The user may only want a portion of the content for re-use in composing another document.

Figure 7:
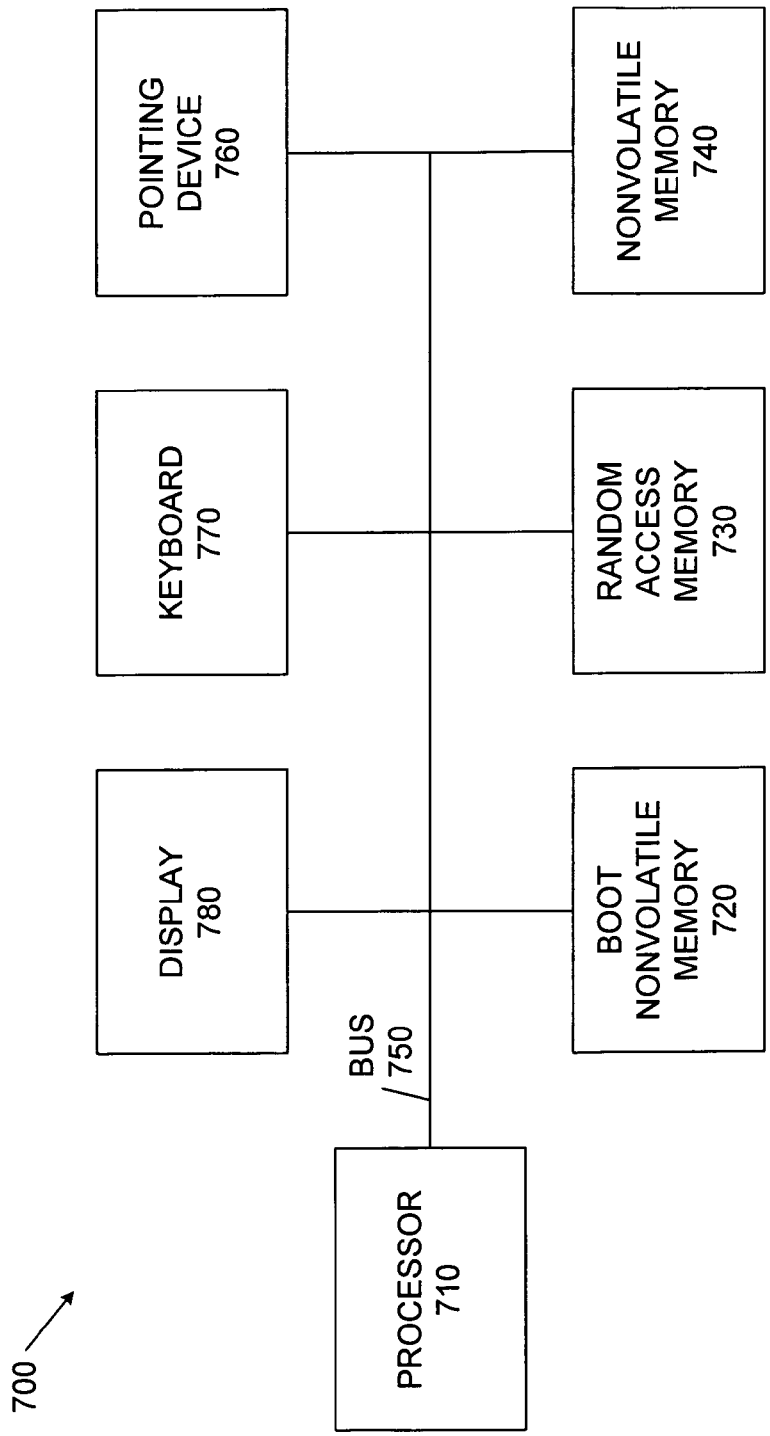
FIG. 7 illustrates one embodiment of a computer architecture.

FIG. 7 illustrates one embodiment of a computer architecture capable of implementing the processes of the subject invention. Computer 700 includes processor 710 capable of executing instructions to perform, for example, the steps of the processes for classifying page elements as content or background (such as those set forth in FIGS. 2-6). Input devices such as pointing device 760 (e.g., mouse) and keyboard 770 permit the user to interact with computer 700. Information generated by the processor may be provided to an output device such as display 780. Computer 700 typically includes random access memory (RAM) 730 that is used by the processor for executing application programs.

In one embodiment, computer 700 includes nonvolatile memory 740. Nonvolatile memory 740 is used to retain programs and data even when the computer is powered down. In one embodiment nonvolatile memory 740 is an electromechanical hard drive. In other embodiments, nonvolatile memory 740 is a semiconductor nonvolatile memory.

Another nonvolatile memory stores the bootstrap code required to boot the computer system. Boot nonvolatile memory 720 is typically a semiconductor nonvolatile memory.

Pointing device 760, keyboard 770, RAM 730, and nonvolatile memory 740 are typically communicatively coupled to processor 710 through one or more address and data buses such as bus 750.

In the preceding detailed description, the invention is described with reference to specific exemplary embodiments thereof. Methods and apparatus for separating page elements of a document into background and content based on type (e.g., text, graphic, image, etc.), size (area), location on the page, dimension (height or width), and frequency of occurrence have been described. Various modifications and changes may be made thereto without departing from the broader spirit and scope of the invention as set forth in the claims. The specification and drawings are, accordingly, to be regarded in an illustrative rather than a restrictive sense.

What is claimed is:

1. A computer-implemented method of classifying elements of a document, comprising:
    receiving a data file defining the document, wherein the document has at least one page and a plurality of elements, wherein a type, location, and size of each element is defined by the file;
    classifying at least one selected element of a selected page into one of a plurality of categories based on at least one of the type, location, size, and dimension of the selected element, wherein the classifying comprises determining whether a location of a center of an element box containing the selected element is within a pre-determined threshold distance from an edge of the selected page and assigning the selected element to a background element category in response to a determination that the location of the center of the element box containing the selected element is within the pre-determined threshold distance from the edge of the selected page;
    generating a classification record comprising an indication of the category into which each of the selected elements is respectively classified; and
    storing the classification record in a computer-readable storage medium.

2. A computer-implemented method of classifying elements of a document, comprising:
    receiving a data file defining a respective arrangement of elements on each of a plurality of pages of the document, wherein the data file associates respective attribute values with each of the elements;
    classifying a selected one of the elements on a selected one of the pages into one of a content category and a background category based on frequency of occurrence of similar elements on one or more pages of the document other than the selected page, wherein the classifying comprises identifying the similar elements on the other pages by comparing one or more attributes of the selected element with corresponding ones of the attributes of the elements on the other pages, and the classifying comprises assigning the selected element to the background category based at least in part on a determination that the frequency of occurrence of similar elements on the other pages exceeds a threshold frequency;
    generating a classification record comprising an indication of the category into which the selected element is respectively classified; and storing the classification record in a computer-readable storage medium.

3. The method of claim 2, wherein the assigning comprises:

in response to a determination that the at least one selected element has a text content attribute value, assigning the at least one selected element to the background category based at least in part on a comparison of an area dimension of the at least one selected element with an area threshold.

4. A computer-implemented method of classifying elements of a document, comprising:

receiving a data file defining a respective arrangement of elements on each of a plurality of pages of the document, wherein the data file associates respective attribute values with each of the elements;

determining for each of the elements a respective content type value, at least one respective size value, and at least one respective page location value from the associated attribute values;

classifying each of the elements into one of a content category and a background category based on frequency of occurrence of similar elements on one or more pages of the document other than the respective page on which the element being classified is arranged, the respective content type value, and at least one of the at least one respective size value and the at least one respective page location value, wherein the classifying comprises classifying each element of a first subset (C1) of the elements into a selected one of the content category and the background category based on the respective content type value and at least one of the at least one respective size value and the at least one respective page location value, classifying each element of a second subset (C2) of the elements into the selected category based on the frequency of occurrence of the similar elements on the other pages of the document, and identifying a third subset (C3) of the elements equal to one of a union of C1 and C2 and an intersection of C1 and C2;

generating a classification record comprising for each of the elements an indication of the category into which the element is respectively classified; and storing the classification record in a computer-readable storage medium.

5. The method of claim 4, wherein the identifying comprises setting C3 equal to the intersection of C1 and C2, and further comprising re-classifying members of C2 and C1 outside of C3 into the non-selected one of the content category and the background category.

* * * * *